United States Patent [19]
Porter et al.

[11] 3,991,131
[45] Nov. 9, 1976

[54] AZIDOFORMYL ANTIOXIDANTS

[75] Inventors: Richard D. Porter, Hudson; Samuel W. Waisbrot, Akron, both of Ohio

[73] Assignee: The Goodyear Tire & Rubber Company, Akron, Ohio

[22] Filed: Mar. 15, 1976

[21] Appl. No.: 666,913

[52] U.S. Cl. .............................. 260/810; 260/349; 260/799; 260/45.95 H
[51] Int. Cl.² ..................... C08K 5/13; C08K 5/28
[58] Field of Search ............... 260/349, 797, 49.95, 260/46.5, 348, 810; 156/330

[56] References Cited
UNITED STATES PATENTS

| | | | |
|---|---|---|---|
| 3,583,939 | 6/1971 | Bostick et al. | 260/46.5 |
| 3,849,230 | 11/1974 | Breslow | 156/330 |

*Primary Examiner*—Lewis Gotts
*Assistant Examiner*—Cary Owens
*Attorney, Agent, or Firm*—F. W. Brunner; J. A. Rozmajzl; Gordon C. Mack

[57] ABSTRACT

Azidoformyl compounds containing a hindered phenolic antioxidant moiety have been found to provide built-in antioxidant protection. They add to and protect polymers, including saturated, unsaturated, linear, crystalline and non-linear-amorphous hydrocarbon polymers, copolymers, terpolymers, etc., including especially polyethylene, polypropylene, polystyrene, and the rubbers, such as natural rubbers, polybutadienes, polyisoprenes, butadiene-isoprene copolymer, butyl rubber, ethylene-propylene copolymer, ethylene-propylene-dicyclopentadiene terpolymer, etc. and blends thereof.

6 Claims, No Drawings

AZIDOFORMYL ANTIOXIDANTS

PRIOR ART

Azidoformates are known. A bibliography is included in the Breslow et al. article in RUBBER CHEMISTRY AND TECHNOLOGY, 43, 605 (1907).

Breslow U.S. Pat. No. 3,849,230 describes their use in adhesives.

Reactions with polymers are disclosed in Bostick et al. U.S. Pat. No. 3,583,939, Suzuki U.S. Pat. No. 3,547,843 and Breslow U.S. Pat. Nos. 3,058,957 and 3,284,421.

THE INVENTION

According to this invention, highly reactive substituents on antioxidants are used to bind them to polymeric materials, and the polymeric reaction products are used as antioxidants. They form a versatile antioxidant which can be built into oxidizable organic materials such as elastomers, plastics, oils, fibers and films, etc. by heating or photolyzing the compound in the presence of the substrate polymer. This largely eliminates the need for specialty copolymers and the amount of protection can be adjusted to the needs of the final product by the processor.

The azidoformyl antioxidants have potential use as specialty products.

The azidoformyl and azidosulfonyl groups have been used in adhesion, attaching functional groups to polymers (i.e. epoxy), as curatives (the di- and polyfunctional systems), and in photographic systems. See Breslow U.S. Pat. Nos. 3,849,230 and 3,284,421.

The only presently known process of built-in antioxidant protection is by copolymerization of an age-resisting monomer, or by using some specialty functionalized polymers.

The process of this invention is the most versatile of the methods used for built-in protection because of its wide applicability and potential cost savings. The ease of handling and processing required to effect the protection as well as the demonstrated potency of the claimed built-in additives, give this system advantages over others.

The azidoformyl compounds which can be used are more particularly azidoformyl phenol compounds having the formula

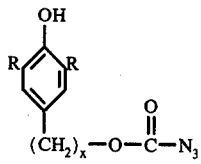

in which $x$ is 2 or 3 and R is saturated tertiary alkyl of 4 to 10 carbon atoms including t-butyl, t-amyl, t-hexyl, etc. The

group may be replaced by $-SO_2-$.

The foregoing compounds have been prepared by the reactions of the aryl ethyl and aryl propyl alcohols in excess phosgene to form the corresponding chloroformates, followed by reaction with sodium azide, which yields the compounds, illustrated here:

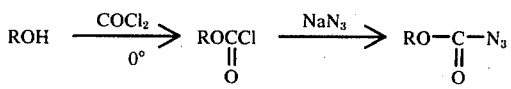

One part of each of the above two compounds was separately milled on a Brabender into NR stock at 375° F. for 3 minutes and 10 minutes. These stocks were extracted continuously in a Soxhlet extractor with methanol for 40 hours and time to absorb 1 per cent $O_2$ was measured on the raw polymer at 80° C.

The results of compounding the above two azidoformyl compounds with natural rubber are given in the following table, in which the compounds are identified simply as Ethylene (m.p. 71.5° to 72.5° C.) and Propylene (m.p. 40.5° to 41.5° C.). Wingstay L is a well-known polymeric hindered antioxidant sold by The Goodyear Tire & Rubber Company.

The results indicate that the antioxidant azidoformyl compounds had reacted with the rubber, and more had reacted during the 10-minute mixing than during the 3-minute mixing.

TABLE

|  | 1 | 2 | 3 | 4 | 5 | 6 |
|---|---|---|---|---|---|---|
| Natural Rubber | × | × | × | × | × | × |
| Ethylene |  | × |  |  | × |  |
| Propylene |  |  | × |  |  | × |
| WINGSTAY L | × |  |  | × |  |  |
| Unextracted | 310 | 250 | 234 | 166 | 289 | 239 |
| Extracted | 28 | 377 | 278 | 217 | 455 | 394 |
| Time of Mixing (min.)[a] | 3 | 3 | 3 | 10 | 10 | 10 |

[a]Brabender at 375° F.

OXIDATION OF GR-S VULCANIZATES by Shelton and Winn, Ind. and Eng. Chem. 38, 71 (1946) discloses the procedure used in the antioxidant tests.

We claim:

1. Azidoformyl compounds having the formula

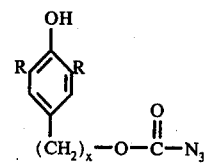

in which $x$ is 2 or 3 and R is a tertiary alkyl substituent containing 4 to 10 carbon atoms.

2. The compound of claim 1 in which $x$ is 2 and R is tertiary-butyl.

3. The compound of claim 1 in which $x$ is 3 and R is tertiary-butyl.

4. Natural rubber reacted with the compound of claim 1 and thereby possessing built-in antioxidant protection.

5. Natural rubber reacted with the compound of claim 2 and thereby possessing built-in antioxidant protection.

6. Natural rubber reacted with the compound of claim 3 and thereby possessing built-in antioxidant protection.

* * * * *